United States Patent [19]

Kirkwood

[11] 4,431,197

[45] Feb. 14, 1984

[54] O-RING GASKETS AND METHOD OF MANUFACTURING SAME

[75] Inventor: Peter A. Kirkwood, Natal, South Africa

[73] Assignee: Fibre-Wound (PTY) Limited, South Africa

[21] Appl. No.: 263,483

[22] Filed: May 14, 1981

[30] Foreign Application Priority Data

May 19, 1980 [ZA] South Africa ............... 80/2968

[51] Int. Cl.³ .................. F16J 15/10; F16J 15/14
[52] U.S. Cl. .................................. 277/1; 277/180; 277/227
[58] Field of Search ........... 277/165, 177, 180, 186, 277/227, 228, 1

[56] References Cited

U.S. PATENT DOCUMENTS

| 792,901 | 6/1905 | Jewett | 277/227 X |
| 2,370,913 | 3/1945 | Procter | 277/227 |
| 2,676,823 | 4/1954 | Olson et al. | 277/227 X |
| 3,195,906 | 7/1965 | Moyers | 277/180 |
| 3,259,404 | 7/1966 | Papenguth | 277/180 X |
| 3,986,721 | 10/1976 | Decker | 277/227 X |

FOREIGN PATENT DOCUMENTS 506030  5/1939  United Kingdom ........... 277/227

Primary Examiner—Robert S. Ward

[57] ABSTRACT

A gasket including an O-ring (12) of an elastomeric material and an annulus (14) formed from a substantially continuous filamentary material, which is wound to form the annulus, the fibre being incorporated in a resinous material and the O-ring being attached to the inner periphery of the annulus.

4 Claims, 5 Drawing Figures

U.S. Patent
Feb. 14, 1984
4,431,197
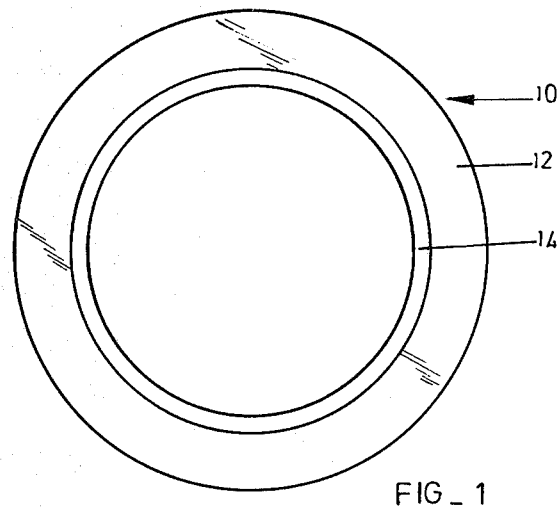
FIG_1
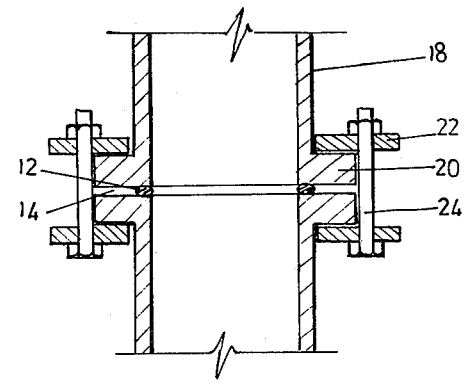
FIG_3
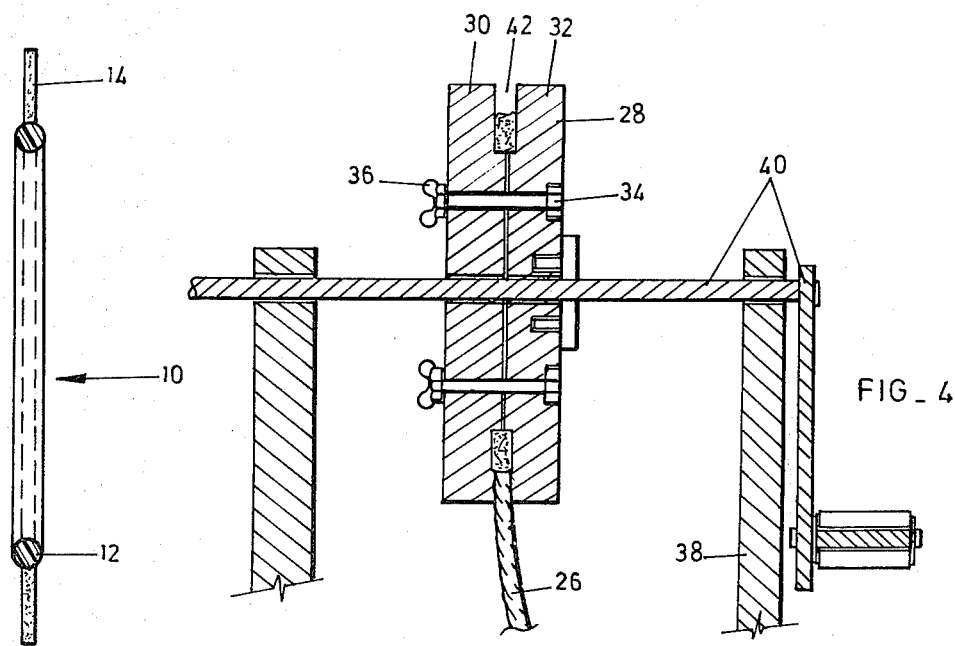
FIG_2
FIG_4
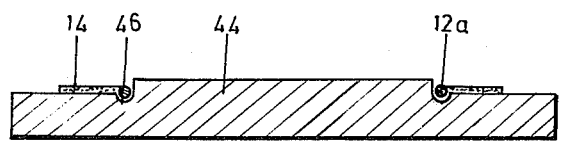
FIG_5

O-RING GASKETS AND METHOD OF MANUFACTURING SAME

This invention relates to gaskets and in particular to gaskets for sealed bolted joints for pipes and to a method of manufacture therefor.

The gaskets of the prior art included those having a rubber or the like O-ring surrounded by a metal annulus to resist large pressures encountered in certain pipe systems. However, for corrosive materials handling systems the annulus has to be of an exotic metal or alloy to resist corrosion. Steel will not suffice for instance. Alternatively a plastics annulus can be used, but under high pressures these gaskets normally rupture.

It is an object of the present invention to provide a gasket in which the annulus is made from a material other than metal and which, at the same time, is at least equally resistant to pressure and corrosion.

According to the invention a gasket includes an O-ring of an elastomeric material and an annulus formed from a substantially continuous filamentary material, which is wound to form the annulus, the fibre being incorporated in a resinous material and the O-ring being attached to the inner periphery of the annulus.

In a preferred form of the invention the fibre is glass fibre, which may be pretensioned during winding.

However, it will be appreciated that other continuously wound fibres, such as carbon, or graphite fibres, boron, boron nitride, silicon carbide, or metal fibres, KEVLAR 29 and 49 (registered Trade Mark of Du Pont de Nemours and Company) and synthetics, cotton, cellulose fibres, beryllium, quartz rubber or vegetable fibres and the like may be used.

The resinous material may be a thermosetting resin such as an epoxy, polyester or vinyl ester or the like, and will be chosen with a view to its resistance to the matter being conveyed in the pipe as well as its resistance to external conditions.

The O-ring may be made from nitrile, rubber, natural rubber, neoprene, fluorocarbon rubber, silicone, ethylene propylene, butyl rubber, acrylic rubber, hypalon or the like.

According further to the invention a method of manufacturing a gasket of the invention includes the steps of drawing a substantially continuous fibre through an un-set resinous composition and winding the coated fibre into a split mould, allowing the resinous composition to cure when the mould is full, removing the annulus so formed therefrom after the curing reaction has been completed and attaching the O-ring to the inner periphery of the annulus so formed.

The method may include the specific steps of drawing the fibre through a resin bath and hand winding the coated fibre onto a split mould, splitting the mould to remove the cured annulus, cutting a linear O-ring element to size and attaching the ends thereof to one another to form an O-ring which is then secured to the annulus on a jig which is adapted to receive and locate the O-ring and the annulus.

An embodiment of the invention is illustrated in the accompanying drawings in which:

FIG. 1 is a plan view; and

FIG. 2 is a sectional side elevation of a gasket according to the invention;

FIG. 3 is a cross section through two pipes showing the gasket in position;

FIG. 4 is a cross section of a split mould with a partially wound filament thereon; and FIG. 5 is an attachment jig for an O-ring in cross section with a gasket thereon.

The gasket 10 shown in the drawings comprises an O-ring 12 of nitrile or other rubber or the like inside an annulus 14 of a wound fibre impregnated with resin.

It will be appreciated that any type of resin and any type of fibre may be used depending on the particular application of the gasket. In particular a fire retardant or fire resistant ingredient may be incorporated such as a chlorinated polymer.

As can be seen in FIG. 3 the gasket 10 is adapted to fit between the flanges of two pipes, the pipes 18 shown in the drawings terminating in stub flanges 20 secured to one another by means of backing rings 22 and bolts and nuts 24. The gaskets of the invention may also be used with full-faced flanges in which case the bolt holes may be formed in the annulus 14 or the gasket may be selected to fit within the shanks of the bolts penetrating the flanges.

The gasket is made by drawing a continuous fibre or filament 26, in FIG. 4 through a bath of un-set resin, such as epoxy resin. The filament 26 is preferably tensioned prior to winding onto the mould 28 by passing the filament around a rod or wire submerged in the bath of resin through which the filament 26 is drawn.

The mould 28 comprises two halves 30 and 32 secured to one another by means of bolts and wing nuts 34, 36. The mould halves 32 and 30 are each formed with an annular, peripheral depression in which the annulus of the gasket is to be formed and once assembled, the mould 28 is located in a frame 38, only part of which is shown, by means of an axle and crank handle assembly 40.

The fibre 26, after its passage through the resin bath, is wound into the gap 42 defined by the annular recesses in the mould halves 30,32 and once this space has been filled, the fibre 26 is cut. The mould is then removed and, if necessary, post-cured in an oven. Once cured, the annulus is removed from the mould 28 by splitting the latter into its two halves after the excess resin and fibre has been trimmed.

A long piece of O-ring element, such as a length of nitrile rubber with a right circular cylindrical cross section, is then laid in the jig 44 shown in FIG. 5 in a groove 46 provided for this purpose. The O-ring element 12a is measured with reference to the groove 46, cut to size and the ends thereof are glued to one another to form the O-ring 12. The annulus 14 is laid on the jig 44 around the O-ring 12 and secured thereto by means of an adhesive, such as a two-part epoxy.

I claim:

1. A gasket including an O-ring of an elastomeric material and an annulus formed from a substantially continuous filamentary material, which is wound to form the annulus, the fibre being incorporated in a resinous material and the O-ring being attached to the inner periphery of the annulus.

2. A gasket according to claim 1 in which the filamentary material comprises a plurality of continuous wound glass fibres which are pretensioned during winding.

3. A method of manufacturing a gasket according to claim 1 including the steps of drawing a substantially continuous fibre through an un-set resinous composition and winding the coated fibre onto a split mould, allowing the resinous composition to cure when the mould is full, removing the annulus so formed therefrom after curing and attaching the O-ring to the inner periphery of the annulus.

4. The method of claim 2 including the steps of drawing the fibre through a bath of resin and hand winding the fibre onto a split mould, splitting the mould to remove the cured fibre, cutting a length of O-ring element to size and attaching the ends thereof to one another to form an O-ring, locating the annulus and the O-ring on a jig adapted to receive the O-ring and the annulus and attaching the O-ring and the annulus to one another.

* * * * *